United States Patent [19]
Ozaki et al.

[11] 3,908,807
[45] Sept. 30, 1975

[54] BICYCLE THREE-SPEED HUB

[75] Inventors: Nobuo Ozaki; Sadao Kawai, both of Osaka, Japan

[73] Assignee: Maeda Industries, Ltd., Osaka, Japan

[22] Filed: July 25, 1974

[21] Appl. No.: 491,761

[30] Foreign Application Priority Data
July 25, 1973 Japan.............................. 48-83465

[52] U.S. Cl. ............................... 192/6 A; 74/750 B
[51] Int. Cl.² ...................... B60K 41/26; F16H 3/44
[58] Field of Search ................... 192/6 A; 74/750 B

[56] References Cited
UNITED STATES PATENTS

| | | | |
|---|---|---|---|
| 2,854,108 | 9/1958 | Douglas | 192/6 A |
| 3,536,171 | 10/1970 | Bergles | 192/6 A |
| 3,726,156 | 4/1973 | Hermanus et al. | 192/6 A X |
| 3,803,947 | 4/1974 | Hillyer | 74/750 B |

*Primary Examiner*—Leonard H. Gerin
*Attorney, Agent, or Firm*—Stewart and Kolasch, Ltd.

[57] ABSTRACT

In a three-speed hub of a bicycle, a hub spindle having an integral sun pinion passes through a hub shell, in which a plurality of planet pinions in mesh with both of a gear ring and said sun pinion are supported by a planet cage connected to said hub shell through low-normal gear pawls, while said gear ring is connected through double-acting pawls to said hub shell, and a sliding clutch coupled with a driver is disposed about said spindle so that it can be engaged or disengaged with said planet cage and/or said double-acting pawls, whereby top gear drive is from said sliding clutch to said hub shell through planet cage, planet pinions, gear ring and double-acting pawls; normal gear drive is from said sliding clutch to hub shell through said planet cage, planet pinions and then low-normal gear pawls; and low gear drive is from said sliding clutch to hub shell through said double-acting pawls, gear ring, planet pinions, and then low-normal gear pawls.

5 Claims, 8 Drawing Figures

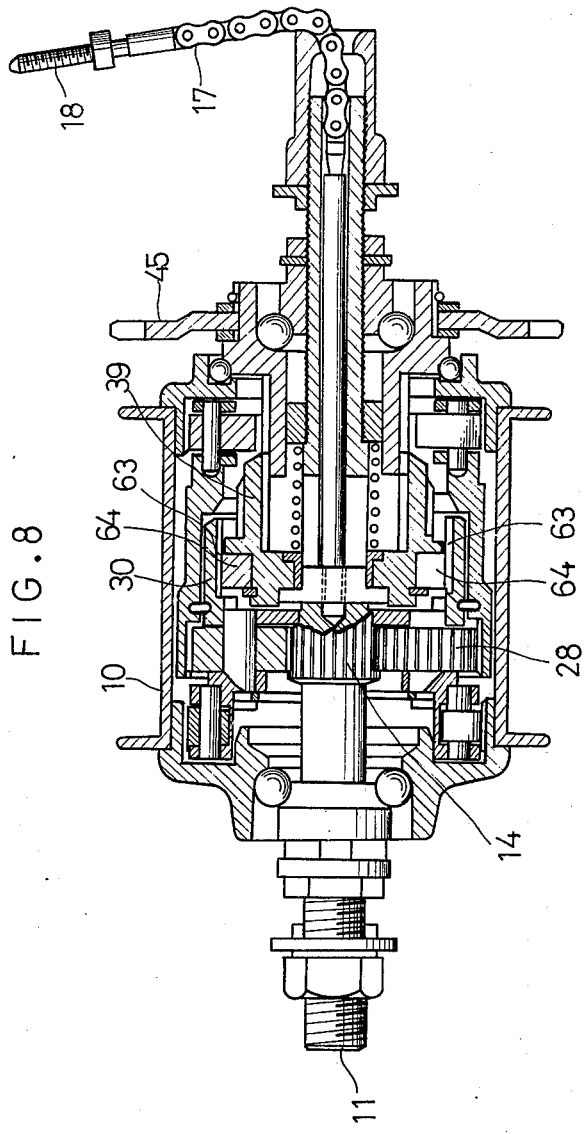

BICYCLE THREE-SPEED HUB

BACKGROUND AND SUMMARY OF INVENTION

The present invention relates to a three-speed hub of a bicycle and more particularly to a bicycle speed change gear mechanism to be internally provided within a bicycle rear hub.

As well known in the fields of bicycle industries, speed change in bicycles has been mostly performed by means of multi-stage sprocket wheels externally mounted on one end of a rear wheel spindle and derailleur cooperatively connected to said sprocket wheels. However, provision of such conventional externally mounted speed change gear mechanism will not permit so good and smart appearance in a whole bicycle. Thus, there has come out a considerable demand tendency for a new speed change gear mechanism for bicycles which can be installed within a bicycle rear hub shell, dispensing with combination of conventional sprocket wheels and derailleur, whereby allowing bicycles to look nicer. In order to meet this demand tendency, a lot of attempts have been made, among which several multi-speed bicycle hubs which are based on the principle of epicyclic gear have been successfully proposed. However, there still remain many problems to be solved for completion of such currently proposed multi-speed hubs and therefore improvements are expected.

One of the general shortcomings in the hithertofore proposed multi-speed rear hubs is that construction thereof is so complicated and a lot of parts are required that occasional troubles and expenses in manufacture are inevitable. A further shortcoming is that undesired skidding in power transmission occasionally occurs because construction thereof requires eight or more pawls for power transmission.

The present invention contemplates over known types of three-speed bicycle hubs. According to the present invention, sliding clutch and ratchet mechanism are effectively combined with epicyclic gear, wherein some parts are designed so as to perform plural functions whereby a number of parts can be omitted. Further, only four to six ratchet pawls are used whereby loss in power transmission is minimized and at the same time compactness of whole mechanism is attained and undesired oscillations among assembled parts which are likely to occur to cause damage and troubles to the mechanism can be remarkably decreased.

Therefore, it is an object of the present invention to provide an improved three-speed hub of a bicycle.

Another object of the invention is to provide an improved three-speed bicycle hub having a sliding clutch and ratchet mechanism combined with specially designed epicyclic gear for effective operation.

A further object of the invention is to provide an improved three-speed bicycle hub having four or six ratchet pawls for allowing compactness of the whole mechanism and minimizing loss in power transmission as well as oscillation among parts thereof.

The above and other objects, features and advantages of the present invention will become more apparent from the following description of some of the preferred embodiments thereof taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 8 is a similar view to FIG. 1, showing a modified embodiment according to the instant invention.

DESCRIPTION OF THE PREFERRED EMBODIMENTS

Figure 1:
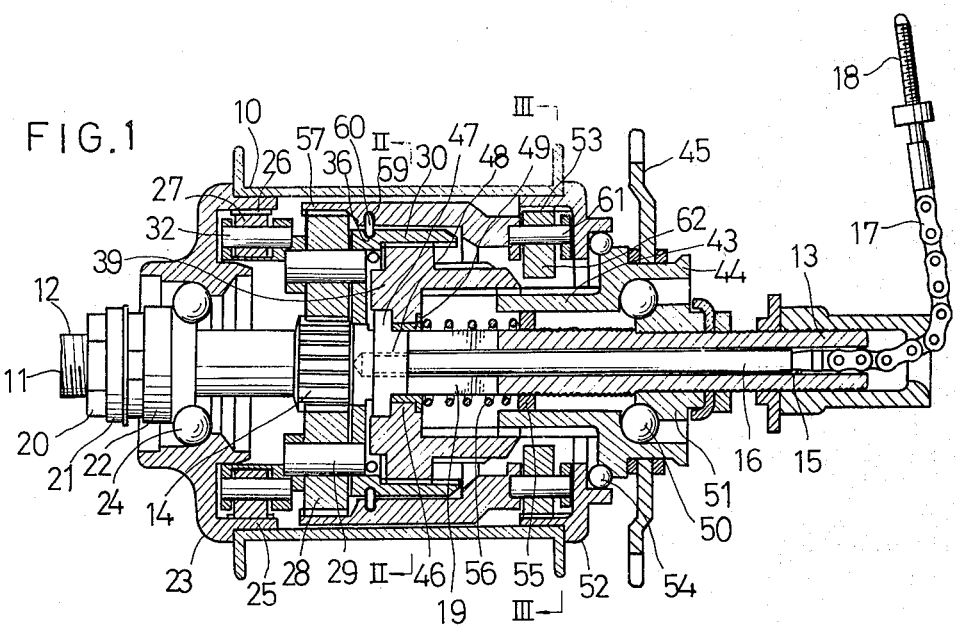
FIG. 1 is an axial section of the preferred embodiment according to the present invention.
Figure 2:
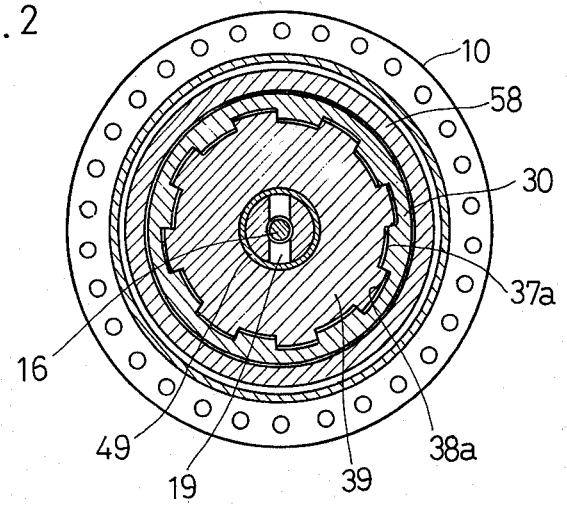
FIG. 2 is a view taken on lines II—II of FIG. 1.
Figure 3:
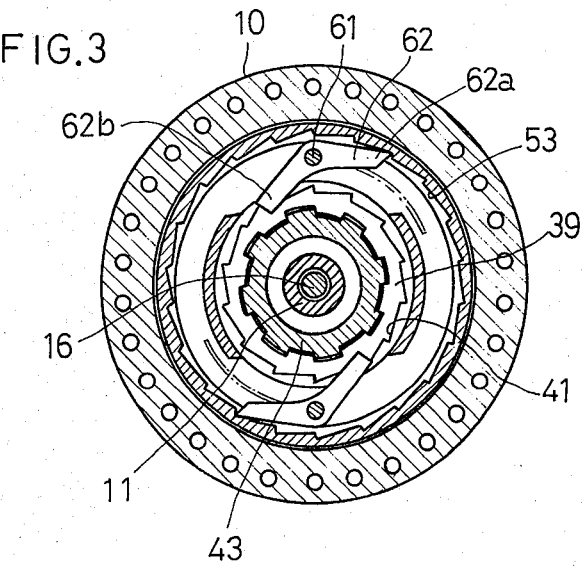
FIG. 3 is a view taken along lines III—III of FIG. 1.
Figure 4:
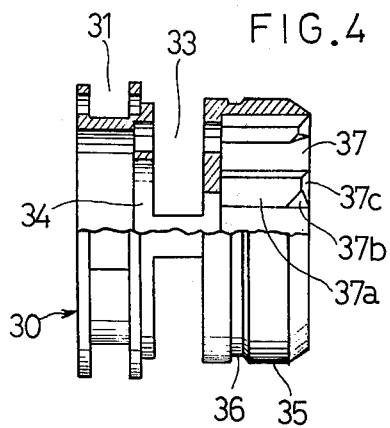
FIG. 4 is a partial sectional view of a planet cage used in the mechanism according to the present invention.
Figure 5:
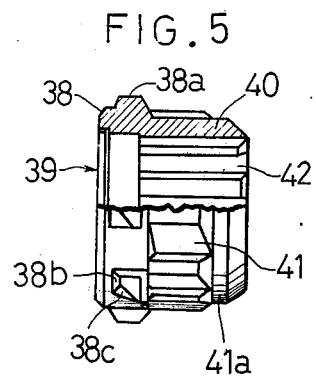
FIG. 5 is a partial sectional view of a sliding clutch incorporated in the present invention.
Figure 6:
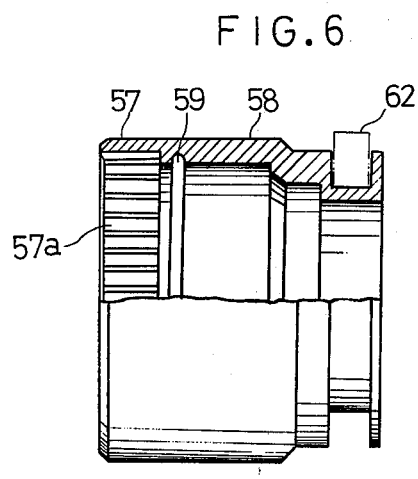
FIG. 6 is a partial sectional view of an annulus or gear ring designed in accordance with the present invention.
Figure 7:
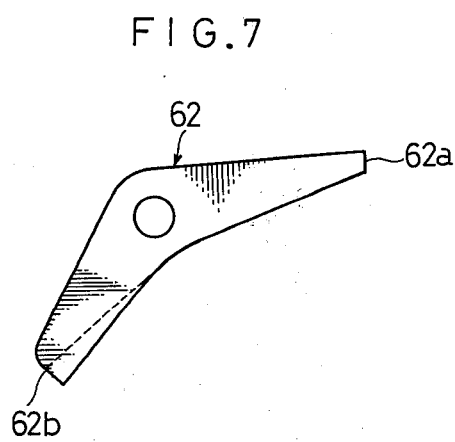
FIG. 7 is an enlarged elevation of a double-acting ratchet pawl to be mounted on said annulus of FIG. 6.

Referring now by reference numerals to the drawings, and in particular to FIGS. 1 to 7 which illustrate the first embodiment of the present invention. The three-speed rear hub according to the present invention has a hub shell 10 which is substantially of conventional configuration but larger in diameter than conventional ones. A hub spindle 11 having threaded ends 12, 13 and an integral stationary sun pinion 14 formed in position between said threaded ends passes through said hub shell 10. The spindle 11 has an axial hole 15 extending from a position adjacent said sun pinion 14 to one end 13 of the spindle 11 for receiving an operation rod 16 connected at one end to an external trigger control device (not shown in the drawings) through a toggle chain 17 and an adjusting bolt 18, and further has a slot 19 which passes in communication with and through said axial hole 15 at right angle at an inward end of said axial hole 15.

Adjacent the left end 12 of the hub spindle 11, a lock nut 20, a washer 21, a cap 22 and a left cone 23 are mounted in order. A plurality of balls 24 are interposed between said cap 22 and cone 23 whereby the latter is freely rotatable about the hub spindle 11. The left cone 23 is provided with a cylindrical shoulder 25, on the outer periphery of which the hub shell 10 is fixedly secured, while ratchet teeth 26 are formed with the internal periphery of said shoulder 25 so as to be always engageable with a plurality of ratchet pawls 27 to be hereinafter described. A plurality of planet pinions 28 are freely rotatably mounted on a respective shaft 29 supported by a planet cage 30 and are always in mesh with said sun pinion 14 mounted on the spindle 11. As particularly shown in detail in FIG. 4, the planet cage 30 has an annular groove 31 in which said ratchet pawls 27 serving as low-normal gear pawls are arranged by means of pawl pins 32 (FIG. 1) and a respective spring (not shown) is provided so that it can always urges said ratchet pawl 27 up in the conventional manner. Further, said planet cage 30 has an annular space 33 communicated with a center space 34, in which spaces said planet pinions and the sun pinion are rotatably received. Furthermore, the planet cage 30 has a cylindrical extension 35, around the outer periphery of which a narrow annular groove 36 is provided for the purpose to be described hereinafter. The internal of said cylindrical extension 35 has a concavo-convex surface 37 forming a boss to be coupled with a spline shaft 38 integrally formed with a cylindrical sliding clutch 39 as particularly shown in detail in FIG. 5. Incidentally, it is preferable to chamfer each of corners of the convex portions 37a of said surface 37 and splines 38a of said spline shaft 38, respectively, for the purpose of smooth and easy engagement and disengagement, as particularly shown by reference numerals 37b, 37c and 38b, 38c in FIGS. 4 and 5.

The sliding clutch 39 has a reduced portion 40, on the external periphery of which are formed with ratchet teeth 41 and a smooth surface 41a for the purpose to be hereinafter described. While, the internal of said reduced portion 40 has a concavo-convex surface 42 serving as a boss to be always in mesh with a spline shaft 43 which extends inwardly from a driver 44 which mounts a driving sprocket wheel 45. Further, the sliding clutch 39 has an internal flange 46 formed adjacent said boss 42, to which flange is fixedly secured a sliding key 47 which is slidable within the slot 19 of the hub spindle 11. The sliding key 47 has an internally threaded center hole 48 to which the threaded free end of said operation rod 16 is screwably connected. Incidentally, reference numeral 49 designates an annular sleeve provided with said internal flange 46 of the sliding clutch 39.

The driver 44 is rotatably mounted about the hub spindle 11 through balls 50 interposed between said driver and a cap 51 which is secured to the hub spindle. By means of further balls 54 interposed between said driver 44 and said right cone 52, the driver 44 is also rotatable relative to a right cone 52 which has an internal ratchet teeth 53 and is fixedly connected with the right end of the hub shell 10. At a position within cylindrical space formed between the internal surface of said spline shaft 43 and the external of said hub spindle 11, a ring 55 is screwably secured to the spindle 11, a coil spring 56 is disposed between said ring 55 and said annular sleeve 49, whereby the sliding clutch 39 is always urged toward inside.

Adjacent the internal periphery of the hub shell 10, there is provided an annulus or gear ring 57 having internal teeth 57a meshed with the teeth of said planet pinions 28. The gear ring 57 has a cylindrical extension 58 slightly spaced in parallel relation with the cylindrical extension 35 of the planet cage 30. And a narrow annular groove 59 is formed with the internal periphery of said extension 58 at a position opposite to said groove 36 of the planet cage 30. Between said two grooves 36 and 59, a snap ring 60 is received for preventing the undesired lateral shift in positional relation between the gear ring 57 and the sliding clutch 39. Pawl pins 61 are supported at both ends by the reduced end of said extension 57 and the right cone 52, and a plurality of double-acting pawls 62 are swingably mounted about each of said pins 61 respectively, and the outward end 62a of said pawls 62 is always in mesh with said ratchet teeth 53 of the right cone 52 while the inward end 62b of each of said pawls 62 is engageable with the ratchet teeth 41 of the sliding clutch 39 at low and normal gear positions.

Referring now in particular to FIG. 8 which illustrates the second embodiment according to the present invention, wherein the construction of the three-speed hub is substantially similar to the first embodiment described in the foregoing. The only difference therebetween consists in that the internal surface of said cylindrical extension 35 of planet cage 30 is provided with ratchet teeth 63 in place of said concavo-convex surface 37 for spline coupling, and further the spline shaft construction 38 in the first embodiment is replaced by a plurality of ratchet claws 64 in order to attain engagement with said ratchet teeth 63.

In operation, as the tension of the toggle chain 17 is loosened by means of external control device, the sliding clutch 39 is pushed toward the planet cage 30 by the action of coil spring 56 to take top gear position as shown in FIG. 1 or FIG. 8. In this position, when the sprocket wheel 45 is driven, the driver 44 is rotated, whereby the sliding clutch 39 is also rotated since the spline shaft 43 is coupled with the boss 42 of the sliding clutch 39. Through spline coupling at 38, the planet cage 30 is rotated simultaneously with said sliding clutch 39. Thus, the planet pinions 28 revolve round the sun pinion 14 at the same speed as that of planet cage 30, rotating about the respective pinion shaft 29. As a result, the gear ring 57 which is in mesh with said planet pinions 28 at 57a is caused to rotate at such a speed as of said revolving speed plus rotating speed of the planet pinions. Rotation of said gear ring 57 is transmitted to the hub shell 10 in only driving direction through the tatchet mechanism 53, 62a. Thus, the hub shell 10 is rotated at higher speed than the driver 44. In this connection, it will be easily understood that the engagement between the low-normal gear pawls 27 and ratchet teeth 26 of the left cone 23 is idle at this stage because the hub shell 10 is rotated at higher speed than the planet cage 30 which supports the low-normal gear pawls 27.

When the operation rod 16 is pulled outwardly by means of the external control device, the sliding key 47 screwed to said rod 16 is forced to slide outwardly within the slot 19 of the hub spindle 11, and at the same time the sliding clutch 39 secured to said key 47 is also pulled outwardly to assume normal gear position in which the smooth surface 41a of the clutch 39 comes into contact with the inward end 62b of the double-acting pawl 62, with still keeping spline coupling at 37, 38 between the sliding clutch 39 and planet cage 30. It should be noted that when the inward end 62b of the double-acting pawl 62 comes into contact with said smooth surface 41a of the sliding clutch 39, the outward end 62a of said pawl 62 becomes disengaged from the ratchet teeth 53 of the right cone 52, since the pawls 62 are swung so as to lower said outward end 62a down. At this stage, when drive is given to the sliding clutch 39 through the sprocket 45 and driver 44, the planet cage 30 is rotated at the same speed as the sliding clutch 39. Simultaneously therewith, the pawls 27 which are mounted on said planet cage 30 in mesh with the ratchet teeth 26 of the left cone 23 give rotation at same speed with the driver 44 to the hub shell 10 because the hub shell 10 is fixedly secured to the left cone 23 and because each outward end 62a of the double-acting pawls 62 is out of engagement with the ratchet teeth 53 of the right cone 52, though the gear ring 57 being rotated. Thus, the normal gear drive is attained.

While, as the operation rod 16 is pulled more outwardly to the maximum by means of the external control device, the sliding key 47 screwed to said rod 16 is forced to slide outwardly to the maximum within the slot 19 of the hub spindle, and at the same time the sliding clutch 39 secured to said key 47 is also pulled outwardly to take low gear position in which ratchet teeth 41 of the sliding clutch 39 come into engagement with the inward end 62b of said double-acting pawls 62, while the splines 38a of the sliding clutch 39 are disengaged from the boss 37 of the planet cage 30. Incidentally, the outward end 62a of said pawls 62 is out of engagement with the ratchet teeth 53 as described in the foregoing. Now, at this stage, when drive is given to the sliding clutch 39 through the sprocket 45 and driver 44, the gear ring 57 is rotated at the same speed with the sliding clutch by the function of said pawls 62. As a result, the planet pinions 28 are rotated about respective pinion shaft 29 and simultaneously revolve round on the sun pinion 14, causing the planet cage 30 to rotate. This means the rotational speed of the planet cage 30 is equivalent to such speed as of rotational speed of the gear ring 57 minus rotational speed of the planet pinions 28. And this decreased rotation of the planet cage 30 is transmitted to the hub shell 10 through the low-normal gear pawls 27, and thus desired deceleration is performed.

It will be easily understood that the operational manner of the second embodiment as shown in FIG. 8 is substantially same with that of the first embodiment as described in detail in the foregoing, although ratchet mechanism 63, 64 being employed in place of spline coupling 37, 38 of the first embodiment.

The invention being thus described, it will be obvious that the same may be varied in many ways. Such variations are not to be regarded as a departure from the spirit and scope of the invention, and all such modifications are intended to be included within the scope of the appended claims.

We claim:
1. A three-speed hub of a bicycle comprising
a hub shell,
a first hub cone secured to one end of said hub shell and having internal ratchet teeth,
a second hub cone secured to the other end of said hub shell and having internal ratchet teeth,
a hub spindle passing through said hub shell,
said hub spindle having an axial hole and a vertical slot communicating in position with said axial hole,
an operation rod having a threaded inward end and being inserted within said axial hole of hub spindle in the manner that it is axially movable by means of an external known control device connected thereto,
a sliding key screwed to said inward end of the operation rod and disposed slidably within said vertical slot of hub spindle,
a driver connected to a sprocket wheel so as to be driven thereby and being rotatable about said hub spindle,
said driver being rotatable with relative to said second hub cone and having an integral hollow spline shaft extending inwardly therefrom,
a sun pinion fixedly mounted on said hub spindle,
a plurality of planet pinions which are always in mesh with said sun pinion,
a plurality of low-normal gear pawls which are engageable in one direction with said internal ratchet teeth of the first hub cone,
a planet cage which supports said planet pinions at one position and said low-normal gear pawls at another position,
said planet cage having a substantially cylindrical extension of which internal periphery is formed with concavo-convex surface serving as a boss,
a gear ring which is always meshed with said planet pinions and has a substantially cylindrical extension circumferentially spaced apart a short distance from said extension of planet cage,
a plurality of double-acting pawls swingably supported at one end of said extension of gear ring,
the outward end of each of said double-acting pawls being engageable in one direction with said ratchet teeth of the second hub cone,
a hollow sliding clutch disposed within said extension of planet cage and having an integral spline shaft and reduced portion extending from said spline shaft thereof,
said sliding clutch having an integral inward flange with which said sliding key is associated,
said spline shaft of sliding clutch being disengageably coupled with said concavo-convex internal surface, viz. boss of said planet cage,
the internal periphery of said reduced portion of sliding clutch being formed with concavo-convex surface serving as a boss to be engageable and axially slidable with said spline shaft extending from said driver,
the external periphery of said reduced portion of sliding clutch being formed with ratchet teeth engageable in one direction with the inward end of each of said double-acting pawls, and further being formed with an smooth surface next to said ratchet teeth thereof,
and, each of said double-acting pawls being swingably supported so that said outward end thereof is disengageable with said ratchet teeth of the second hub cone when said inward end thereof is in mesh with said ratchet teeth of the sliding clutch or is in contact with said smooth surface of the sliding clutch.

2. The three-speed hub of a bicycle, as set forth in claim 1, wherein
a ring is screwed onto said hub spindle within said hollow spline shaft extending from said driver, and
a coil spring is mounted about said hub spindle so that it extends between said inward flange of the sliding clutch and said ring screwed onto the hub spindle.

3. The three-speed hub of a bicycle, as set forth in claim 1, wherein
a first narrow annular groove is formed with the external periphery of said extension of planet cage,
a second narrow annular groove is formed with the internal periphery of said extension of gear ring at a position opposite to said first annular groove, and
a snap ring is received within both of said first and second annular grooves for restricting relative lateral shift of said planet cage and gear ring.

4. The three-speed hub of a bicycle, as set forth in claim 1, wherein
each of convex portions of said concavo-convex surface formed with the internal periphery of said planet cage is chamfered at its outward end, and each of convex portions of said spline shaft integrally formed with said sliding clutch is chamfered at its inward end.

5. The three-speed hub of a bicycle, as set forth in claim 1, wherein a plurality of ratchet pawls are provided with the external periphery of said sliding clutch in place of said spline shaft construction of the sliding clutch, and said internal periphery of the extension of gear ring is formed with ratchet teeth in place of said concavo-convex surface thereof.

* * * * *